Aug. 7, 1962 W. A. BAILEY 3,048,094
VENTILATING POULTRY HOUSE
Filed Sept. 23, 1959

INVENTOR
William A. Bailey

BY Karl W. Flocks
ATTORNEY

United States Patent Office 3,048,094
Patented Aug. 7, 1962

3,048,094
VENTILATING POULTRY HOUSE
William A. Bailey, 6910 Furman Parkway, Riverdale, Md., assignor to himself and George B. Sweet, Montgomery County, Md., as tenants by the entirety
Filed Sept. 23, 1959, Ser. No. 841,742
16 Claims. (Cl. 98—33)

The present invention relates to a ventilated poultry house and particularly to a ventilated poultry house in which the pens are each in communication with an air supply duct to both receive air therefrom and deliver air thereto and in which the pens are in serial communication to provide for the circulation from pen to pen.

In the housing of poultry, and other small animals and fowl, it is necessary that the animals be supplied with fresh air, that stale air be removed and that the temperature of the air be kept within a satisfactory range regardless of ambient temperature. In addition, it is desirable that the housing structure be as economical as possible, in view of the intense competition in the poultry industry.

While ventilation of poultry houses has been suggested in the prior art, those constructions now known have not been satisfactory for one or more of several reasons. For example, in some constructions a large amount of duct work has been required, thus unduly adding to the cost of the poultry house. In addition, the known poultry houses have not always provided for proper circulation, and thus in practice, circulation of air to supply fresh air to all of the individual animals or fowl and to supply air at the proper temperature has not been obtained.

It is desirable in poultry house construction that the heat generated by the fowl be utilized to the maximum extent possible, consistent with the objectives of supplying sufficient fresh air to the fowl. Previously poultry house constructions have not provided both an economical construction, taking advantage of the heat of the fowl and also so circulating the air that the fowl are at all times supplied with sufficient fresh air.

An object of the present invention is to provide a ventilated poultry house of economical construction.

Another object of the present invention is the provision of a ventilated poultry house in which a minimum amount of duct work is used.

Still another object of the present invention is to provide a ventilated poultry house in which the heat from the fowl is utilized during cold weather, while at the same time supplying sufficient fresh air to the fowl.

A further object of the present invention is the provision of a ventilated poultry housing which ventilation control to all of the fowl is easily effected.

A still further object of the present invention is to provide a ventilated poultry house which will provide air at proper temperature to all of the fowl in the house during the various seasons of the year.

Other objects and the nature and advantages of the instant invention will be apparent from the following description taken in conjunction with the accompanying drawings, wherein.

Figure 1:
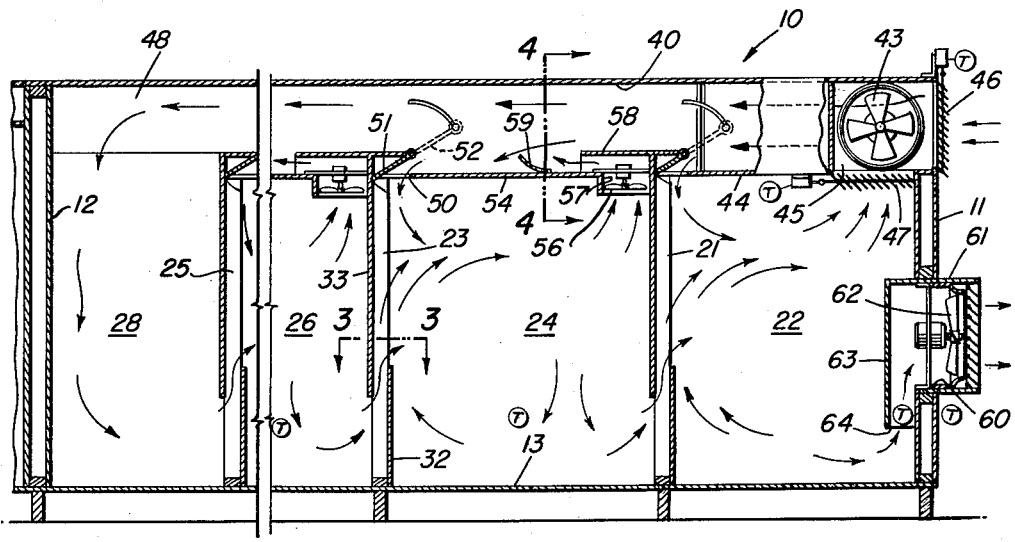
FIG. 1 is a cross sectional view showing a ventilated poultry house in accordance with the present invention.
Figure 2:
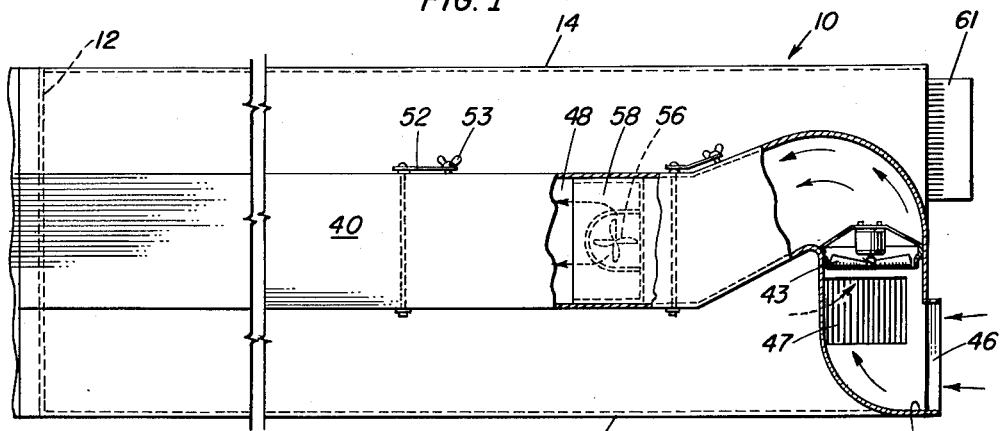
FIG. 2 is a plan view, with parts in section, of the ventilated poultry house of FIG. 1.

Referring now to the drawings, there is shown in FIG. 1 a ventilated poultry house 10 provided with the end walls 11 and 12, a floor 13 and a roof (not shown). As may be seen in FIG. 2, the poultry house 10 has a pair of oppositely disposed parallel side walls 14 and 16 and the poultry house 10 may be seen to be generally rectangular and is preferably of a considerable length in the direction of the walls 14 and 16. There may be provided, to the left of end wall 12, an egg room, which is partially shown in the drawings.

The poultry house 10 is divided into a number of pens by partitioned walls which extend across the building between the side walls 14 and 16. As shown in FIG. 1, there is provided a partition wall 21 spaced from end wall 11, to thereby define an end pen 22. Spaced from partition wall 21 are additional partition walls 23 and 25, to thus provide for the two intermediate pens 24 and 26, and to also provide the second end pen 28. It will be understood, of course, that there may be provided only one intermediate pen, such as pen 24 or 26, but that in practice there are provided a large number of such intermediate pens.

Figures 3, 4:
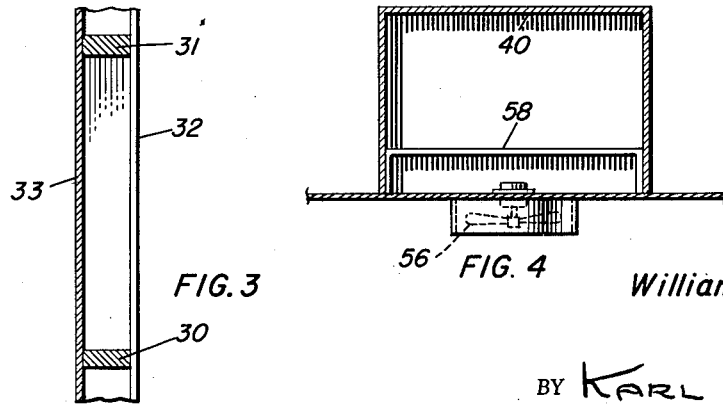
FIG. 3 is a cross sectional view taken on the line 3—3 of FIG. 1.
FIG. 4 is a cross sectional view taken on the line 4—4 of FIG. 1.

Each of the partition walls 21, 23, 25, is constructed so as to provide for ventilation between the pens divided thereby, and at the same time to provide for economy of construction. Thus, each of these partition walls comprises a plurality of upstanding frame members, such as the frame members 30 and 31 shown in FIG. 3. It will be understood, of course, that as many frame members may be used to construct one partition wall as is dictated by conventional building practice to provide necessary strength. A sheathing 32 is provided on the side of the frame members 30, 31, which is closest to end wall 11, the sheathing 32 extending upwardly from the floor 13 to an intermediate level which is preferably approximately one-third of the height of the pens. Each partition wall has on the other side of the frame members a sheathing 33 that extends downwardly from the ceiling (or top of the pen) to a level that is slightly below the top of sheathing 32. Thus, there is provided an economical and ducted partition wall that permits the flow of air from one pen to the other, the air flowing in each case toward end wall 11 and toward the ceiling as is indicated by the arrows in FIG. 1.

An air duct 40 extends above the pens longitudinally of the building 10, air duct 40 having an intake end generally designated 41 in the end wall 11, and communicates with atmosphere through an aperture 42 in end wall 11. A push fan 43, driven by a suitable motor, is supported in the duct 40 adjacent the intake 42, this fan serving to force air through duct 40 from end wall 11 towards end wall 12. As may be seen in FIG. 1, ceiling 44 of end pen 22 has an aperture 45 therein for communicating the duct 40 with the pen 22.

Both the aperture 42 and the aperture 45 are provided with louvers 46 and 47, and these louvers are motor operated and thermostatically controlled in known manner, as by motors 46' and 47' so that the air drawn through each of them may be suitably and differentially valved. As a consequence, the temperature of the air forced through duct 40 by push fan 43 may be controlled.

Duct 40 has an outlet end 48 in unobstructed communication with end pen 28 and so air discharging from outlet end 48 will enter into the end pen 28, striking the end wall 12 and being deflected thereby in a downward and circulatory pattern. Communication is also provided between duct 40 and each of the other pens, there being provided, as exemplified by pen 24, an opening 50 in the ceiling 54 of pen 24. Opening 50 is adjacent the partition wall 23, which will be seen to be the wall of pen 24 that is remote from end wall 11 and push fan 43. A control vane 51 is pivotally mounted adjacent opening 50, and has a movable actuating arm 52 which may be held in varying adjusted positions. A simple thumb screw 53 is shown (in FIG. 2) for securing the vane 51 in a selected position, but of course the actuating arm 52 may be otherwise controlled, as by a remote control system. The several control vanes extend into the duct 40, and are inclined towards the push fan 43 and thereby effect the introduction of air from duct 40 into the several pens, the air being caused to move downwardly through the opening in the ceiling of the pen and along the partition wall through which air is entering from the adjacent pen in an upward direction. Thus, it will be seen that in pen 24 the vane 51 will direct air from the duct 40 downwardly along partition wall 23 and that this air will strike the air entering pen 24 from pen 26 through partition wall 23, which latter air will flow upwardly. The result of the two impinging air streams will be a circulatory air system within pen 24.

One or more of the intermediate pens is also provided with an auxiliary fan in the ceiling thereof, there being shown in intermediate pen 24 an auxiliary fan 56 that is suitably driven and that is positioned in a ducted opening 57 of the ceiling 54. Auxiliary fan 56 discharges air into an auxiliary duct 58, which may be seen in FIGS. 1, 2, and 4. Auxiliary duct 58 is positioned to discharge air into air duct 40 so that the air issuing therefrom moves in the same general direction as air in duct 40, i.e., towards discharge end 48 of duct 40. A deflector 59 may be provided downstream of the discharge end of auxiliary duct 58 to insure mixing of the auxiliary air issuing from auxiliary duct 58 with the air flowing in air duct 40. It will be noted that the ducted opening 57 containing auxiliary fan 56 is adjacent to partition wall 21, which partition wall is the closest partition wall of pen 24 to push fan 43. The positioning of auxiliary fan 56 is such that circulation of air within pen 24 is enhanced, auxiliary fan 56 having as an additional function the withdrawing of warm or hot air from the ceiling region of the pen during warm weather.

End wall 11 has an aperture 60 therein through which extends a duct 61. Positioned in the duct 61 is a pull fan 62. A duct 63 extends downwardly parallel to end wall 11, the intake end 64 of duct 63 being in the vicinity of the floor 13 of pen 22, to thereby remove stale air from the floor of pen 22.

In use, the flow of air in poultry house 10 will be through duct 40, the air being impelled by push fan 43, and assisted as necessary by pull fan 62. Thus, the air will circulate, generally in the manner shown by the arrows in FIG. 1 to provide flow through the duct 40 and out the discharge end 48 thereof into end pen 28. Thereafter, air will flow through the various ducted partitions serially through the several pens from end pen 28 to end pen 22, and will be exhausted by the pull fan 62. In addition to this general flowage of air, air will be circulated within each of the pens, particular air circulation patterns being set up by the positioning of opening 50 and control vane 51 and the positioning of opening 57 and the control of auxiliary fan 56 in each of the pens wherein they are provided. Thus, in addition to the generalized flow pattern mentioned above, in each of the pens there will be provided, as shown in pen 24, a downward flow of fresh air along the partition wall thereof remote from puch fan 43, from duct 40, and an upward and impinging flow of air from the adjacent pen, which is either the end pen 28 or the pen closer to pen 28.

During warm weather the louvers 46 and 47 will be so controlled that most or all of the air entering duct 40 will be atmospheric air entering through louver 46, and the auxiliary fans 56 will be operating at or near capacity, to thereby remove as much hot, stale air as posible from the ceilings of the pens and to reduce the temperature of this air and to freshen it by mixing it with the outside air flowing through the duct 40. Pull fan 62 will also be operating in order to provide good circulation and to remove stale air from end pen 22 and to assist in the introduction of fresh air into each of the pens and the flowage of such fresh air through the pens.

In cold weather most or all of the air will be drawn through louver 47, from end pen 22, only as much air as is necessary to provide suitable fresh air being permitted to enter through louver 46. Pull fan 62 will be operating minimally, if at all, and auxiliary fans 56 will be substantially inactive. The circulation of air in the pens will be such that warmer air near the ceilings will be circulated downwardly so as to provide air of a suitable temperature throughout the pens and to avoid stratification with attendant cold air layers near the floor 13.

There has been provided a ventilated poultry house that is economical in construction, having therein a minimum of duct work and utilizing simple and economical partition walls for partitioning the poultry house into several individual pens and for providing a circulatory system within and between the pens. In addition, the introduction of fresh air into each of the pens is provided, as well as circulation of air from a push fan through each of the pens to a pull fan. The poultry house herein disclosed also provides for adequate circulation of air within the several pens thereof to insure the supply of a suitable amount of fresh air at proper temperature to the fowl during all seasons of the year.

It will be obvious to those skilled in the art that various changes may be made without departing from the spirit of the invention and therefore the invention is not limited to what is shown in the drawings and described in the specification but only as indicated in the appended claims.

What is claimed is:

1. A ventilated poultry house or the like comprising a building having a pair of side walls, a pair of end walls, a floor and a ceiling, partition walls extending across said building between the side walls thereof and dividing said building into a series of pens, there being at least two end pens and an intermediate pen, an air duct extending above said pens longitudinally of said building, said air duct having an intake end at one end wall of said building and communicating with an atmosphere through an aperture in said one end wall, a push fan in said duct at said one end for forcing air through said duct from said one end to the opposite discharge end thereof, an aperture in said duct upstream of said fan and communicating with the end pen therebelow, thermostatically controlled motorized louver means in said apertures for modulating the temperature of the air forced by said fan, said duct having the discharge end thereof in unobstructed communication with the other end pen, the pens other than said other end pen each communicating with said duct through an opening in the ceiling thereof that is adjacent the partition wall of each said pen that is closest to the said other end pen, each said opening having a control vane associated therewith the said vanes being inclined towards said push fan to thereby direct air from said duct downwardly along the partition wall to which each said opening is adjacent, at least one intermediate pen having an auxiliary fan in the ceiling thereof communicating with an auxiliary duct positioned to discharge air into said air duct and to move air into said air duct in the same general direction as the air moves therein, said auxiliary fan being positioned adjacent the partition wall that is closest to the said push fan, said partition walls comprising spaced upright frame members, a sheathing on the side of the frame members closest to the push fan extending upwardly from the floor of the building to an intermediate level and a sheathing on the other side of the frame members extending downwardly from the ceiling to a level slightly below the level of said first mentioned sheathing, and a pull fan communicating with said one end pen for exhausting air therefrom to atmosphere whereby fresh temperate air may be supplied to each of said pens and air of proper temperature may be circulated into and through each of said pens to maintain proper temperature therein.

2. A ventilated poultry house or the like comprising a building having a pair of side walls, a pair of end walls, a floor and a ceiling, partition walls extending across said building between the side walls thereof and dividing said building into a series of pens, there being at least two end pens and an intermediate pen, an air duct extending above said pens longitudinally of said building, said air duct having an intake end at one end wall of said building and communicating with atmosphere through an aperture in said one end wall, a push fan in said duct at said one end for forcing air through said duct from said one end to the opposite, discharge end thereof, an aperture in said duct upstream of said fan and communicating with the end pen therebelow, louver means in said apertures for modulating the temperature of the air forced by said fan, said duct having the discharge end thereof in unobstructed communication with the other end pen, the pens other than said other end pen each communicating with said duct through an opening in the ceiling thereof that is adjacent the partition wall of each said pen that is closest to the said other end pen, each said opening having control vane means associated therewith for directing air from said duct downwardly along the partition wall to which each said opening is adjacent, at least one intermediate pen having an auxiliary fan in the ceiling thereof communicating with an auxiliary duct positioned to discharge air into said air duct and to move air into said air duct in the same general direction as the air moves therein, said auxiliary fan being positioned adjacent the partition wall that is closest to the said push fan, said partition walls comprising spaced upright frame members, a sheathing on the side of the frame members closest to the push fan extending upwardly from the floor of the building to an intermediate level and a sheathing on the other side of the frame members extending downwardly from the ceiling to a level slightly below the level of said first mentioned sheathing, and a pull fan communicating with said one end pen for exhausting air therefrom to atmosphere whereby fresh temperate air may be supplied to each of said pens and air of proper temperature may be circulated into and through each of said pens to maintain proper temperature therein.

3. A ventilated poultry house or the like comprising a building having a pair of side walls, a pair of end walls, a floor and a ceiling, partition walls extending across said building between the side walls thereof and dividing said building into a series of pens, there at least two end pens and an intermediate pen, an air duct extending above said pens longitudinally of said building, said air duct having an intake end at one end wall of said building and communicating with atmosphere through an aperture in said one end wall, a push fan in said duct at said one end for forcing air through said duct from said one end to the opposite, discharge end thereof, an aperture in said duct upstream of said fan and communicating with the end pen therebelow, louver means in said apertures for modulating the temperature of the air forced by said fan, said duct having the discharge end thereof in unobstructed communication with the other end pen, the pens other than said other end pen each communicating with said duct through an opening in the ceiling thereof that is adjacent the partition wall of each said pen that is closest to the said other end pen, each said opening having a control vane associated therewith said vanes being inclined towards said push fan to thereby direct air from said duct downwardly along the partition wall to which each said opening is adjacent, at least one of said intermediate pens having an auxiliary fan in the ceiling thereof communicating with an auxiliary duct positioned to discharge air into said air duct and to move air into said air duct in the same general direction as the air moves therein, said auxiliary fan being positioned adjacent the partition wall that is closest to the said push fan, said partition walls comprising spaced upright frame members, a sheathing on the side of the frame members closest to the push fan extending upwardly from the floor of the building to an intermediate level and a sheathing on the other side of the frame members extending downwardly from the ceiling to a level slightly below the level of said first mentioned sheathing, and a pull fan communicating with said one end pen for exhausting air therefrom to atmosphere whereby fresh temperature air may be supplied to each of said pens and air of proper temperature may be circulated into and through each of said pens to maintain proper temperature therein.

4. A ventilated poultry house or the like comprising a building having a pair of side walls, a pair of end walls, a floor and a ceiling, partition walls extending across said building between the side walls thereof and dividing said building into a series of pens, there being at least two end pens and an intermediate pen, an air duct extending above said pens longitudinally of said building, said air duct having an intake end at one end wall of said building and communicating with atmosphere through an aperture in said one end wall, a push fan in said duct at said one end for forcing air through said duct from said one end to the opposite, discharge end thereof, an aperture in said duct upstream of said fan and communicating with the end pen therebelow, louver means in said apertures for modulating the temperature of the air forced by said fan, said duct having the discharge end thereof in unobstructed communication with the other end pen, the pens other than said other end pen each communicating with said duct through an opening in the ceiling thereof that is adjacent the partition wall of each said pen that is closest to the said other end pen, each said opening having control vane means associated therewith for directing air from said duct downwardly along the partition wall to which each said opening is adjacent, at least one intermediate pen having an auxiliary fan in the ceiling thereof communicating with an auxiliary duct positioned to discharge air into said air duct and to move air into said air duct in the same general direction as the air moves therein, said auxiliary fan being positioned adjacent the partition wall that is closest to the said push fan, said partition walls comprising means for permitting air to flow therethrough from a pen remote from said push fan to the next closer pen thereto and to direct air upwardly for impingement against the downwardly directed air whereby fresh temperate air may be supplied to each of said pens and air of proper temperature may be circulated into and through each of said pens to maintain proper temperature therein.

5. The ventilated poultry house of claim 4, and a pull fan communicating with said one end pen for exhausting air therefrom to atmosphere.

6. A ventilated poultry house or the like comprising a building having a pair of side walls, a pair of end walls, a floor and a ceiling, partition walls extending across said building between the side walls thereof and dividing said building into a series of pens, there being at least two end pens and an intermediate pen, an air duct extending above said pens longitudinally of said building, said air duct having an intake end at one end wall of said building and communicating with atmosphere through an aperture in said one end wall, a push fan in said duct at said one end for forcing air through said duct from said one end to the opposite, discharge end thereof, an aperture in said duct upstream of said fan and communicating with the end pen therebelow, louver means in said apertures for modulating the temperature of the air forced by said fan, said duct having the discharge end thereof in unobstructed communication with the other end pen, the pens other than said other end pen each communicating with said duct through an opening in the ceiling thereof that is adjacent the partition wall of each said pen that is closest to the said other end pen, each said opening having means associated therewith for varying the size thereof and for directing air from said duct downwardly along the partition wall to which each said opening is adjacent, said partition walls comprising means for permitting air to flow therethrough from a pen remote from said push fan to the next closer pen thereto and to direct air upwardly for impingement against the downwardly directed air whereby fresh temperate air may be supplied to each of said pens and air of proper temperature may be circulated into and through each of said pens to maintain proper temperature therein.

7. A ventilated poultry house or the like comprising a building having a pair of side walls, a pair of end walls, a floor and a ceiling, partition walls extending across said building between the side walls thereof and dividing said building into a series of pens, there being at least two end pens and an intermediate pen, an air duct extending above said pens longitudinally of said building, said air duct having an intake end at one end wall of said building and communicating with atmosphere through an aperture in said one end wall, a push fan in said duct at said one end for forcing air through said duct from said one end to the opposite, discharge end thereof, means for modulating the temperature of the air forced by said fan, said duct having the discharge end thereof in unobstructed communication with the other end pen, the pens other than said other end pen each communicating with said duct through an opening in the ceiling thereof, each said opening having control vane means associated therewith for directing air downwardly from said duct, said partition walls comprising means for permitting air to flow therethrough from a pen remote from said push fan to the next closer pen thereto and for directing air upwardly for impingement against the downwardly directed air whereby fresh temperate air may be supplied to each of said pens and air of proper temperature may be circulated into and through each of said pens to maintain proper temperature therein.

8. The ventilated poultry house of claim 7, said control vane means being inclined towards said push fan.

9. The ventilated poultry house of claim 7, at least one of said intermediate pens having an auxiliary fan in the ceiling thereof communicating with an auxiliary duct positioned to discharge air into said air duct and to move air into said air duct in the same general direction as the air moves in said duct.

10. The ventilating poultry house of claim 7, wherein said partition walls comprise spaced upright frame members, a sheathing on the side of the frame members closest to the push fan extending upwardly from the floor of the building to an intermediate level and a sheathing on the other side of the frame members extending downwardly from the ceiling to a level slightly below the level of said first mentioned sheathing.

11. The ventilating poultry house of claim 7, and a pull fan communicating with said one end pen for exhausting air therefrom to atmosphere.

12. A ventilated poultry house or the like comprising a building having a pair of side walls, a pair of end walls, a floor and a ceiling, partition walls extending across said building between the side walls thereof and dividing said building into a series of pens, there being at least two end pens and an intermediate pen, an air duct extending above said pens longitudinally of said building, said air duct having an intake end at one end wall of said building and communicating with atmosphere through an aperture in said one end wall, a push fan in said duct at said one end for forcing air through said duct from said one end to the opposite discharge end thereof, said partition walls comprising spaced upright frame members, a sheathing on the side of the frame members closest to the push fan extending upwardly from the floor of the building to an intermediate level and a sheathing on the other side of the frame members extending downwardly from the ceiling to a level slightly below the level of said first mentioned sheathing, said frame members comprising posts intermediate said side walls, said posts being exposed above said sheathing on one side thereof and below said sheathing on the other side thereof, and means in said ceiling communicating with said air duct for directing air downwardly for impingement against the air flowing from said partition walls.

13. A ventilated poultry house or the like comprising a building having a pair of side walls, a pair of end walls, a floor and a ceiling, partition walls extending across said building between the walls thereof and dividing said building into a series of pens, there being at least two end pens and an intermediate pen, an air duct extending above said pens longitudinally of said building, said air duct having an intake end at one end wall of said building and communicating with atmosphere through an aperture in said one end wall, a push fan in said duct at said one end for forcing air through said duct from said one end to the opposite discharge end thereof, means for modulating the temperature of the air forced by said fan, said duct having the discharge end thereof in unobstructed communication with the other end pen, the pens other than said other end pen each having means communicating with said duct for directing air from said duct downwardly along the partition wall of each said pen that is closest to said other end pen, at least one intermediate pen having means to cause air to flow from adjacent the ceiling thereof and adjacent the partition wall that is closest to the said push fan into said air duct, said partition walls comprising means for permitting air to flow therethrough from a pen remote from said push fan to the next closer pen thereto and for directing air upwardly for impingement against the downwardly directed air whereby fresh temperate air may be supplied to each of said pens and air of proper temperature may be circulated into and through each of said pens to maintain proper temperature therein.

14. A ventilated poultry house or the like comprising a building having a pair of side walls, a pair of end walls, a floor and a ceiling, partition walls extending across said building between the walls thereof and dividing said building into a series of pens, there being at least two end pens and an intermediate pen, an air duct extending above said pens longitudinally of said building, said air duct having an intake end at one end wall of said building and communicating with atmosphere through an aperture in said one end wall, a push fan in said duct at said one end for forcing air through said duct from said one end to the opposite discharge end thereof, said duct having the discharge end thereof in unobstructed communication with the other end pen, the pens other than said other end pen each having means communicating with said duct for directing air from said duct downwardly along the partition wall of each said pen that is closest to said other end pen, at least one intermediate pen having means to cause air to flow from adjacent the ceiling thereof and adjacent the partition wall that is closest to the said push fan into said air duct, said partition walls comprising means for permitting air to flow therethrough from a pen remote from said push fan to the next closer pen thereto and for directing air upwardly for impingement against the downwardly directed air whereby fresh temperate air may be supplied to each of said pens and air of proper temperature may be circulated into and through each of said pens to maintain proper temperature therein.

15. A ventilated poultry house or the like comprising a building having walls, a floor and a ceiling, partition walls extending across said building and dividing said building into a series of pens, an air duct extending above said pens longitudinally of said building and communicating with atmosphere, means for forcing air through said duct, said partition walls comprising spaced upright posts intermediate the building walls, a sheathing on one side of the posts extending upwardly from the floor of the building to an intermediate level and a sheathing on the other side of the posts extending downwardly from the ceiling to a level slightly below the level of said first mentioned sheathing, said posts being exposed above said sheathing on one side thereof and below said sheathing on the other side thereof, and means in said ceiling communicating with said air duct for directing air downwardly for impingement against air flowing through said partition walls.

16. A ventilated poultry house or the like comprising a building having a pair of side walls, a pair of end walls, a floor and a ceiling, partition walls extending across said building between the side walls thereof and dividing said building into a series of pens, there being at least two end pens and an intermediate pen, an air duct extending above said pens longitudinally of said building, said air duct having an intake end at one end wall of said building and communicating with atmosphere through an aperture in said one end wall, a fan in said duct for forcing air through said duct from said one end to the opposite, discharge end thereof, means for modulating the temperature of the air forced by said fan, said duct having the discharge end thereof in unobstructed communication with the other end pen, the pens other than said other end pen each communicating with said duct through an opening in the ceiling thereof, each said opening having control vane means associated therewith for directing air downwardly from said duct, said partition walls comprising means for permitting air to flow therethrough from a pen remote from said fan to the next closer pen thereto and for directing air upwardly for impingement against the downwardly directed air whereby fresh temperate air may be supplied to each of said pens and air of proper temperature may be circulated into and through each of said pens to maintain proper temperature therein.

References Cited in the file of this patent

UNITED STATES PATENTS

| 1,731,289 | Blair | Oct. 15, 1929 |
| 2,327,664 | Otis | Aug. 24, 1943 |

FOREIGN PATENTS

| 12,938 | Great Britain | of 1906 |
| 15,574 | Great Britain | of 1907 |
| 196,875 | Germany | Mar. 27, 1908 |
| 208,220 | Germany | Apr. 15, 1909 |
| 213,257 | Germany | Sept. 13, 1909 |
| 442,550 | France | Sept. 3, 1912 |
| 371,869 | Germany | Mar. 22, 1923 |
| 509,362 | Germany | Oct. 8, 1930 |